(12) United States Patent
Neumeier (10) Patent No.: US 8,920,081 B2
(45) Date of Patent: Dec. 30, 2014

(54) INTERFACE BETWEEN A RECEPTACLE BODY AND AN INSERT DESIGNED, IN PARTICULAR, AS A TOOL HOLDER OF A WORKPIECE HOLDER

(75) Inventor: Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 1135 days.

(21) Appl. No.: 12/924,188

(22) Filed: Sep. 22, 2010

(65) Prior Publication Data

US 2011/0068545 A1 Mar. 24, 2011

(30) Foreign Application Priority Data

Sep. 23, 2009 (DE) .......................... 10 2009 042 665

(51) Int. Cl.
*B23B 31/113* (2006.01)
*B23C 5/26* (2006.01)
*B23Q 3/12* (2006.01)

(52) U.S. Cl.
CPC ............... *B23B 31/113* (2013.01); *B23Q 3/12* (2013.01); *Y10S 279/90* (2013.01)
USPC ............... 409/232; 409/234; 279/89; 279/93; 279/104; 279/900

(58) Field of Classification Search
USPC .......... 409/234, 232; 408/239 A, 226, 239 R, 408/231, 232; 279/89, 90, 91, 93, 94, 104, 279/105, 102, 103, 138, 900; 82/159, 160, 82/155
See application file for complete search history.

(56) References Cited

U.S. PATENT DOCUMENTS 1,975,877 A * 10/1934 Urving ............................ 279/93
2,212,406 A *  8/1940 Rusnak ........................... 279/91
(Continued)

FOREIGN PATENT DOCUMENTS

DE    299 14 047 U1   12/1999
GB    2 248 199 A     1/1992

OTHER PUBLICATIONS

Search Report from the European Patent Office; dated Jan. 3, 2011.

*Primary Examiner* — Eric A Gates
*Assistant Examiner* — Paul M Janeski
(74) *Attorney, Agent, or Firm* — Emch, Schaffer, Schaub & Porcello Co. LPA (57) ABSTRACT

An interface between a receptacle body and an insert designed, in particular, as a tool or workpiece insert, comprises a receptacle body (2) having a cylindrical receiving bore (4), which is circumscribed by a first plane surface (6) extending at a right angle to the bore axis and in which a first cone surface (9) is arranged, said first cone surface being coaxial with the bore axis and being arranged so that its tapered end faces toward the plane surface. The insert (3) has a pin (15) that is disposed to be plugged into the receiving bore (4) and is circumscribed by a second plane surface (22). At an axial distance from the second plane surface (22), said pin has a second cone surface (22), the tapered end of said second cone surface being arranged so as to face toward the second plane surface. With the pin (15) inserted in the receiving bore (4), the two plane surfaces are in superimposed contact while the two cone surfaces (9, 22) can be biased relative to each other by limited twisting of the insert relative to the receptacle body.

44 Claims, 9 Drawing Sheets

(56) References Cited

U.S. PATENT DOCUMENTS

| | | | |
|---|---|---|---|
| 2,219,907 A * | 10/1940 | Ross | 279/93 |
| 6,059,492 A | 5/2000 | Hecht | |
| 6,276,879 B1 * | 8/2001 | Hecht | 409/234 |
| 6,974,287 B2 * | 12/2005 | Neumeier | 409/232 |
| 7,070,367 B2 * | 7/2006 | Krenzer | 408/226 |
| 7,101,127 B2 * | 9/2006 | Kimura et al. | 409/232 |
| 7,320,566 B2 * | 1/2008 | Osawa et al. | 408/231 |
| 8,021,088 B2 * | 9/2011 | Hecht | 408/231 |
| 8,678,723 B2 * | 3/2014 | Osawa et al. | 408/231 |
| 2006/0039766 A1 | 2/2006 | Hecht | |
| 2006/0127194 A1 * | 6/2006 | Schafer | 408/231 |

* cited by examiner

INTERFACE BETWEEN A RECEPTACLE BODY AND AN INSERT DESIGNED, IN PARTICULAR, AS A TOOL HOLDER OF A WORKPIECE HOLDER

The invention relates to an interface between a receptacle body and an insert designed, in particular as a tool holder or a workpiece holder, said insert being connectable with the receptacle body, and a receptacle body as well as an insert for such an interface.

In doing so, a receptacle body is understood to mean, to name a few examples, a stationary or driven spindle, a chuck, a drilling tool, a tool turret disk or the like, in particular also a tool holder such as, for example defined by DIN 69880, July 1990, part 8, pages 1 through 3, said tool holder having been known in practice in a multitude of embodiments for stationary and revolving tools.

BACKGROUND OF THE INVENTION

Considering CNC machine tools for a cutting-type manufacture, it has been known to change tools either directly or by means of a tool holder insert in a receptacle body, for example, a spindle of the corresponding driving units, by means of automatic tool changing arrangements in order to achieve, in doing so, an appropriate flexibility in view of various machining tasks and in order to also be able to rapidly and accurately replace worn tools. In order to enable this tool changing operation and in order to ensure that, following the tool change, the required high machining accuracy is maintained, strict requirements exist regarding the interface between the tool or the tool holder insert and the receptacle body, said interface being referred to as the coupling point. In practice, in particular interfaces using a so-called conical/plane surface junction between two tool components have proven to be successful, two examples of these having been described in DE 148 910 A1 and in DE 102 19 600 C5. In these known interfaces, the receptacle body has a conical receiving bore that is circumscribed by a first plane surface that extends rectangularly with respect to the bore axis and into which a tool holder insert having a corresponding conically shaped projection or collet pin can be inserted. A second plane surface is provided on the projection or the collet pin, said plane surface circumscribing said projection or collet pin and extending at a right angle relative to the projection or collet pin axis, while the cone angles of the receiving bore and the projection or collet pin are almost approximately the same. Both the conical receiving bore and the conical projection or collet pin of the tool holder insert are configured so as to open, i.e., widen, toward the tool side, thus enabling an easy installation of the tool holder insert on the receptacle body at the interface.

However, the quality of the connection between the tool holder insert and the receptacle body at the interface significantly depends on the degree of cleanliness at the interface. Even minimal amounts of contaminants that potentially reach the cone surface of the receiving bore or that enter between the plane surfaces of the receptacle body and the tool holder insert during a tool change, for example, can lead to considerable concentricity inaccuracies of the tool when the tool holder insert is mounted in the receptacle body. Consequently, automatic tool changing systems, as a rule, comprise special measures to keep the interface clean during a tool change, such measures including, for example, rinsing of the receiving bore and the tool holder insert before and after the tool change.

When a manual tool change is performed, keeping the interface clean is substantially more problematic because foreign bodies of contaminants can be detected by the naked eye only up to a certain size, and keeping the interface clean is ultimately dependent on the operator.

Furthermore, under extremely confined space conditions as exist, for example, with NC-controlled lathes comprising pivotable tool carriers, clamping of the tool holder inserts in the conical receiving bores is difficult. A clamping from the rear side of the tool holder insert facing away from the tool, for example by means of a threaded spindle inserted in the receptacle body, is not possible in the case of turret disks, for example.

SUMMARY OF THE INVENTION

Consequently, it is the object of the invention to provide an interface and a receptacle body, as well as an insert, in particular a workpiece holder insert or a tool holder insert for said interface, said interface not being susceptible to contamination and being rapidly and easily operated while ensuring the highest concentricity accuracy, whereby said interface is also suitable for small tool diameters (less than approximately 20 mm).

In order to achieve this object the interface in accordance with the invention displays the features of patent claim 1, while the receptacle body in accordance with the invention and an insert in accordance with the inventions, in particular a workpiece insert or tool insert for this interface, are the subject matter of patent claims 12 and 26, respectively.

In the interface in accordance with the invention, the receptacle boy has a cylindrical receiving bore on one face side, said receiving bore being circumscribed by a first plane surface extending rectangularly to the bore axis. This plane surface need not be continuous; it may be discontinuous; however, in any event, it is a plane surface that has been finely machined with great precision. Inside the receiving bore is a first come surface, said cone surface being coaxial with the bore axis and having its tapered end facing toward the first plane surface.

The insert, in particular the tool holder insert or workpiece holder insert, associated with the receptacle body has a collet pin that is disposed to be inserted in the receiving bore and is circumscribed by a second plane surface extending rectangularly to one collet pin axis, whereby said plane surface may also be discontinuous in circumferential direction; however, in any event, the latter is configured as a finely machined plane surface. The collet pin bears a second cone surface at an axial distance from the second plane surface, said second cone surface being arranged so that its tapered end faces toward the second plane surface. With the collet pin inserted in the receiving bore, the two plane surfaces are in superimposed contact while the two cone surfaces can be biased relative to each other by limited twisting of the collet pin relative to the receiving bore, thus creating a bias pressing the two plane surfaces against each other.

The first cone surface that is located in the depth of the receiving bore and opens in the direction facing away from the first plane surface, i.e., tapers toward the plane position surface, is largely protected against contamination due to its position in the depth of the receiving bore alone. However, should dirt particles, for example those greater than 0.01 mm, come to be deposited on the plane surface or on the cone surface, coupling—with an appropriately small gap between the two plans surfaces of the receptacle body and the insert—can no longer occur between the insert an the receptacle body because the cone surfaces facing each other can no longer be brought into engagement with each other by an attempted rotary movement of the insert relative to the receptacle body so that a faulty coupling is prevented.

The new interface is also particularly suitable for small tool diameters (smaller than 20 mm), in which, as experience has shown, dirt leads to greater concentricity errors because the guide ratios become less favorable over the tool length. The new interface is self-centering and is characterized by high accuracy due to the plane surfaces and the cone surfaces that form a cone/plane surface abutment. At the same time, the coupling operation between the insert and the receptacle body is performed by simple insertion and twisting of the collet pin of the insert in the receiving bore in a simple and fast manner, in which case the interface—in coupled state of the receptacle body and the insert—ensures high accuracy and stability.

The receptacle body with its cylindrical receiving bore and the interior cone surface can be manufactured in a relatively simple manner, this also equally applying, in particular, to the insert that is designed as a workpiece holder insert or as a tool holder insert. In doing so, the inserts may be adapted to the most diverse clamping conditions of workpieces or tools; thus, it is also conceivable to manufacture the entire insert in one piece with the tool, for example, of steel or hard metal. Inasmuch as clamping of the insert in the receiving bore may be accomplished by only a limited rotary motion of the insert about the receiving bore axis, the new interface can also be advantageously used in extremely confined spaces.

Additional features and advantages of the invention are the subject matter of subordinate claims.

DETAILED DESCRIPTION OF THE INVENTION

The tool receiving or tool holding device shown in FIGS. 1 through 3 comprises an interface 1—hereinafter also to be referred to as the receiving system—between a receptacle body 2 configured as a cylindrical spindle an a tool holder insert—hereinafter, for the sake of simplicity, being referred to as insert 3. The receptacle body 2 may be supported so as to be stationary or rotatable. Said receptacle body has, on its face side associated with the insert 3, an essentially cylindrical receiving bore 4 that is coaxial with the receptacle body 2, the form of said receiving bore also being obvious, in particular, from FIGS. 7 and 8 and having a bore axis 5.

Figure 7:
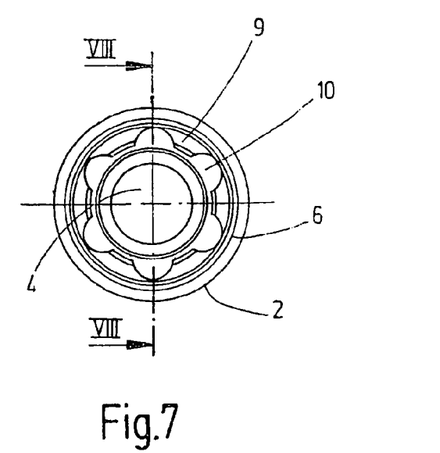
FIG. 7 the receptacle body of the device in accordance with FIG. 3, in a plan vies of the face side being provided with the receiving bore, and in a different scale.
Figure 8:
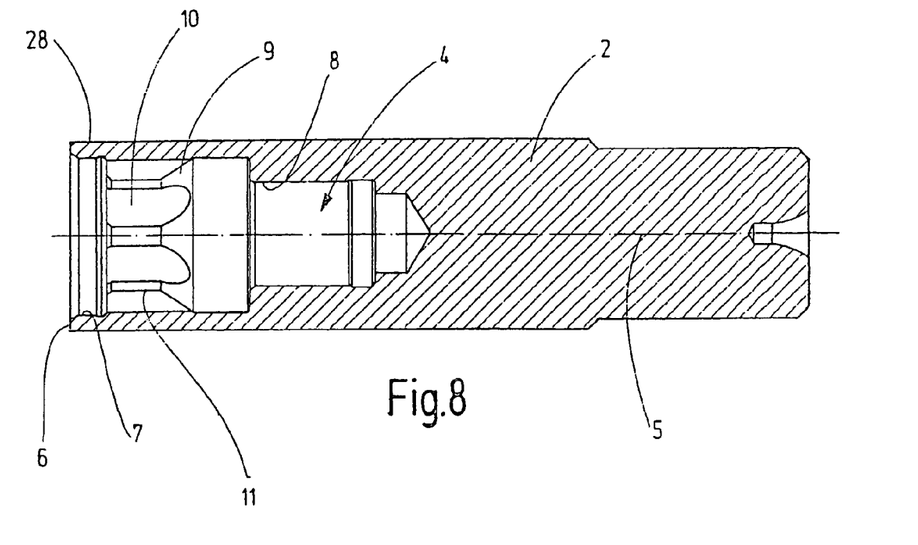
FIG. 8 the receptacle body in accordance with FIG. 7, in section along line VIII-VIII of FIG. 7, in a side view.

On the face side (FIG. 8, left) of the receptacle body 2 associated with insert 3, there is a first finely machined, dimensionally stable plane surface 6 extending at a right angle relative to the bore axis 5, said plane surface adjoining—via a chamfer—a cylindrical pre-centering surface 7 in the receiving bore 4, whereby said pre-centering surface like anther pre-centering surface 8 in the receiving bore 4, is arranged so as to be coaxial with the bore axis 5. Between the two pre-centering surfaces 7, 8 there is, provided on the inside wall of the receiving bore 4, a first cone surface 9 that is coaxial with the bore axis 5 as is obvious, in particular, from FIG. 3, the tapered end 10 of said cone surface facing toward the first plane surface 6. The cone surface 9 is discontinuous due to axis-parallel, channel-like or groove-like recesses 20 having a partially circular cross-section, said recesses being arranged around the circumference of the receiving bore 4 so that, overall, a profile resembling a gear as shown in FIG. 7 is attained. As is clearly obvious from FIGS. 9, 10, this profile includes axis-parallel ribs 11 between the channel-like recesses 10, whereby the cone surface 9 interrupted by the recesses 10 is created on said ribs.

Referring to the embodiment shown in FIGS. 1 through 4, the insert 3 comprises a clamping nut 12 for the accommodation of a collet chuck receptacle 13. Said insert has an insert body 14 bearing the collet chuck receptacle 13 on the one side and is provided with a cylindrical collet pin 15 so as to represent in one integral piece on the other side, said collet pin being disposed to be plugged into the receiving bore 4 of the receptacle body 2. The collet pin 15 is circumscribed by a finely machined, dimensionally accurate second plane surface 17, said second plane surface being provided on the insert body 14 and extending at a right angle relative to the collet pin axis 16, and is formed on a disk-shaped part 18 having two diametrically opposed open-edge recesses 19, said recesses forming catch means that will still be explained in detail hereinafter. Two parallel key surfaces 20 are provided on two sides that are angularly offset with respect to the recesses 19, said key surfaces being disposed for attaching a wrench.

At an axial distance from the second plane surface 17, the collet pin 15 has an essentially cylindrical profile part 21 that is coaxial with the collet pin axis 16 and has a greater diameter, said profile part 21 having a second cone surface 22 whose tapered end 23 is arranged so as to face toward the second plane surface 17. The cone surface 22 is interrupted by axis-parallel channel-like or groove-like recesses 24 having a partially circular cross-section, said recesses extending over the length of the profile part 21 and being uniformly distributed over the circumference of said profile part in such a manner that, between adjacent recesses 24, respectively, there are ribs 25 on a common lateral cylinder surface, thus resulting in a profile similar to a gear.

Figure 9:
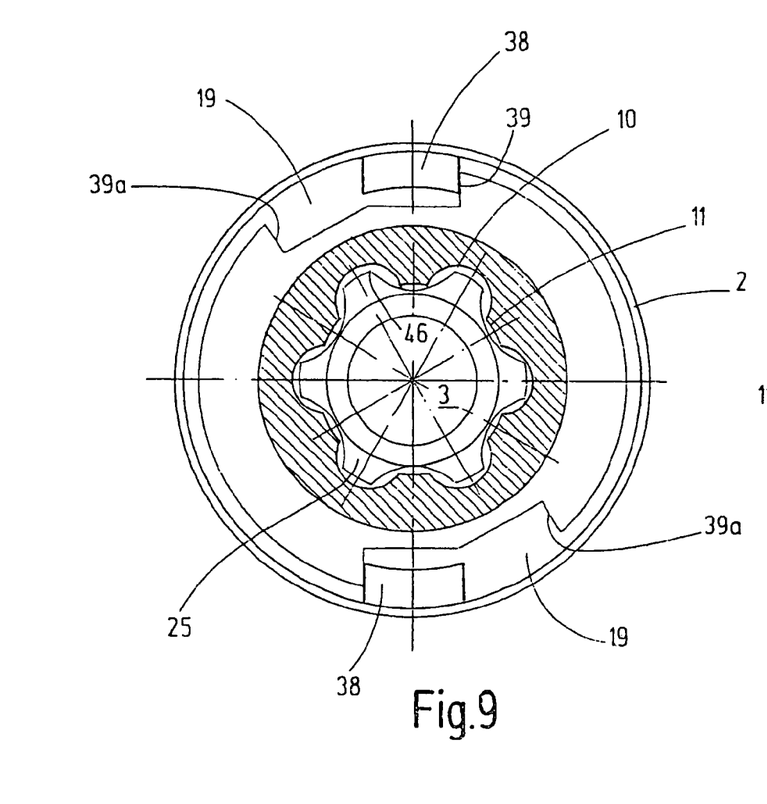
FIGS. 9 and 10 the device in accordance with FIG. 2, illustrating the released and clamped position of the tool holder insert relative to the new receptacle body, each in a cross-sectional representation of the receptacle body in accordance with FIG. 8 through its receiving profile into which has been projected the tool holder insert in order to illustrate the two different rotational positions relative to the receptacle body.
Figure 10:
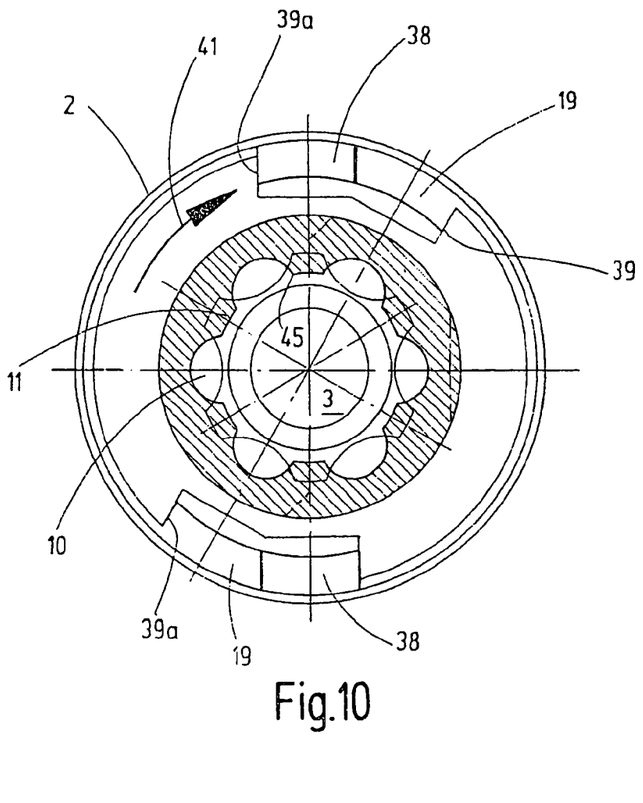

As is particularly obvious from FIGS. 9, 10, the recesses 24 with the interposed ribs 25 of the profile part 21 of the collet pin 15 are designed so as to display the same division as and be complementary to the recesses 10 and ribs 11 of the inside profile of the receiving bore 4 bearing the cone surface 9 in such a manner that—with the collet pin 15 plugged into the receiving bore 4—two gears meshing with each other with play are provided that, as is illustrated by FIG. 9, enable a simple plug-in of the collet pin.

The number and the cross-sectional profile of the recesses 10 and the ribs 11 of the receiving bore 4 and of the recesses 24 and the ribs 25 of the collet pin 15 may otherwise be selected as desired, for example as a function of the diameter of the receiving bore and of the collet pin, or to satisfy other specific requirements. Instead of the number of six recesses 10, 24 selected in the depicted exemplary embodiment, there may be, for example, only two or more than six recesses. The partially circular cross-sectional form of the recesses depicted in FIG. 9, for example, allows a very simple manufacture by milling out. By using suitable tools, it is also possible to produce profiles known from gearing technology.

Clamping means 26 for a collet pin 15 of an insert 3 inserted in the receiving bore 4 are provided on the receptacle body 2. Referring to the embodiment shown in FIGS. 1-8, the clamping means 26 comprise a head ring 27 having an essentially rectangular cross-sectional form, said head ring being placed on a cylindrical fitting surface 28 (FIG. 3) of the receptacle body 2 displaying a prespecified radial ply. The head ring 27 is provided with two diametrically opposed radial threaded bores 29 (cf. FIG. 5). A hex socket setscrew 30 is screwed into one of the threaded bores 29, said setscrew having a flat point 31 coming into engagement with a conical recess 32 of the receptacle body 2 in the region of its fitting surface 28 and, in doing so, centering the head ring 27 in a form-fitting manner on the receptacle body 2. A plastic sphere 33 is pressed into the hex socket in order to prevent an inadvertent actuation.

On the side diametrically opposite the conical recess 32, the receptacle body 2 is provided with a similar cone-shaped recess 34, into which a sphere 35 may be pressed by means of a pressure screw 36, said pressure screw being provided in the other threaded bore 29.

The fitting surface 28 is sealed toward the outside by two torroidal sealing rings 37, said rings being arranged in corresponding annular recesses of the head ring 27.

Two diametrically opposed, axially projecting dogs 38 are provided on the free face side of the head ring 27, said dogs coming into engagement—with the insert 3 inserted in the receiving bore 4—with the recesses 19 of said insert (cf. FIGS. 2, 9, 10) and, at the same time, being disposed for changing the position in circumferential direction when the insert 3 is coupled with the receptacle body 2 or uncoupled therefrom.

Coupling the insert 3 with the receptacle body 2 and the uncoupling o said insert from said receptacle body at the interface 1 is accomplished in the following manner:

The collet pin 15 of the insert 3 is inserted in the receiving bore 4 in the twisted position relative to the receptacle body 2 with its collet pin 15 corresponding to the relaxed position shown in FIG. 9. Insertion is facilitated in that the dogs 38 abut against a corresponding lateral wall 39 of the respective recess 19 of the insert 3 and are guided by said lateral wall. At the same time, the axially spaced apart pre-centering surfaces 7, 8 in the receiving bore 4, said pre-centering surfaces 7, 8 interacting with corresponding pre-centering surfaces 7a, 8a on the collet pin 15 of the insert 3 relative to the receiving bore 4, said pre-centering further facilitating the insertion of the insert 3. The interior profile gearing formed by the recesses and the ribs 10, 11 in the receiving bore 4 enables, in this rotational position of the insert 3, an unimpeded insertion of the profile part 21 of the insert 3, said profile part having matching profile gearing. In doing so, the parts adopt the relaxed position shown in FIG. 9.

As soon as the two plane surfaces 6, 17 of the receptacle body 2 and the insert 3 are superimposed in an unimpeded snugly fitting manner, the insert 3 can be twisted in the receiving bore 4 in clockwise direction into the clamped position of said insert as indicated by arrow 41, said clamped position of said insert as indicated by arrow 41, said clamped position being defined in that the dogs 38 come into abutment with the other lateral surface 39a of the respectively associate recess 19 of the insert 3. In this rotational position, the cone surfaces 9, 22 of the receptacle body 2 and of the insert 3, respectively, re in superimposed contact with each other in the region of the ribs 11 and 25, respectively; i.e., the gear profiles of the two parts overlap as is shown by FIG. 10.

Now, the pressure screw 36 of the head ring 27 is actuated, said pressure screw pressing the sphere 35 into its recess 34 of the receptacle body 2 in radial direction, and, in doing so, elastically deforming the wall of the receiving bore 4 of the receptacle body 2 in the region between the cone surface 9 and the plane surface 6 in a radially inward direction. In order to enable this elastic deformation of the wall of the receiving bore 4 in this region, the inside diameter of the head ring 27 is slightly greater than the outside diameter of the plane surface 28 on which said head ring is arranged. The radial diameter deformation of the cylindrical plane surface 28 of the receptacle body 2 during the clamping operation is relatively minimal. For example, the illustrated exemplary embodiment, said deformation amounts to approximately 0.006 mm.

Due to this elastic radial diameter change of the wall o the receiving bore 4 in the region of the cone surface 9, the cone surface 9 of the receptacle body 2 is pressed correspondingly in inward radial direction on two opposing points with the result that the insert 3 is drawn by way of its cone surface 22 in axial direction into the depth of the receiving bore 4, whereby the degree of this drawing force is a function of the size of the cone angle of the cone surfaces 9, 22 that interact with each other. As a result of this, the plane surface 17 of the insert 3 is pressed with correspondingly great force against the plane surface 6 on the receptacle body 2, while the cone surfaces 9, 22 that are biased and coaxial relative to each other will center the insert 3 in exact radial direction relative to the receptacle body 2 on the receptacle body and on the insert 3, respectively, so that all the advantages of a cone/plane surface abutment are given.

In order to uncouple the insert 3 the pressure screw 36 is released, whereby the receiving bore 4—due to its inherent elasticity—returns again from its slightly oval shape into its biased state into the cylindrical form. Pressure is removed from the cone surfaces 9, 22 in axial direction, and the insert 3 can be rotated out of the position in accordance with FIG. 10, against the direction of arrow 41, back into the relaxed position in accordance with FIG. 9, in which the dogs 28 abutting against the respective lateral wall 39 of the recess 19 establish the positional orientation. The insert 3 can now again be easily pulled out of the receiving bore 4.

The axial spacing conditions between the plane surface 6 and the first cone surface 9 of the receptacle body as well as between the second plane surface 17 and the second cone surface 22 of the insert 3 are selected in such a manner that—with the collet pin 15 completely inserted in the receiving bore 4 and with the unimpededly abutting plane surfaces 6, 17 in the relaxed position in accordance with FIG. 9—minimal axial play exists between the plane surfaces and the cone surfaces, respectively, said play allowing the manual twisting of the insert 3 with minimal force into the position in accordance with FIG. 10, in which the cone surfaces 9, 22 are superimposed. The joint gap between the plane surfaces 6, 17 is indicated at 42 in FIG. 6. in the described exemplary embodiment, said gap has size on the order of approximately 0.005 mm. Depending on the respective requirements and situations, for example, the dimensions of the interface, said gap may also be made larger or smaller.

If, during insertion of the insert 3 in the receptacle body 2 there should be contaminants on one of the plane surfaces 6, 17 or one of the cone surfaces 9, 22, said contaminants having a particular size of, for example, greater than 0.01 mm, the insert can no longer be twisted out of the position in accordance with FIG. 9 into the position in accordance with FIG. 10, because the cone surfaces 9, 22, that have been most precisely machined in a dimensionally stable manner can no longer be moved on each other, and thus mutually block the gear profiles of the receptacle body 2 and the insert 3 on the ribs 11, 25 in an interlocking manner. In this manner, both any faulty coupling is precluded in the case of contamination and it is ensured that—with proper coupling—the interface 1 is biased without play in the plane position of the insert 3 on the receptacle body 2 and centered exactly.

In the described exemplary embodiment, two superimposed opposing pressure points being approximately punctiform are provided on the circumference of the receptacle body 2, said pressure points being created by the setscrew 30 and by the pressure screw 36 as well s by the sphere 35. Depending on the given respective embodiment, in particular the dimensions of the embodiment, it is also possible to provide several pressure points for example, three pressure points that are uniformly distributed in circumferential direction.

Figure 1:
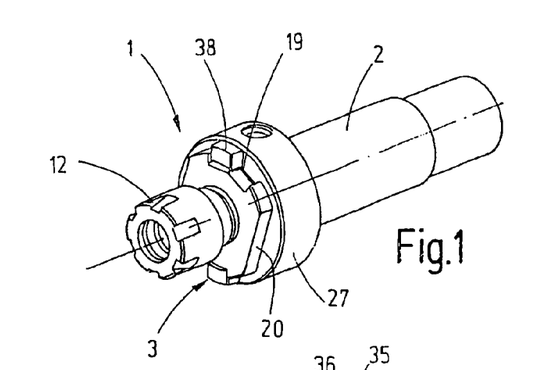
FIG. 1 a tool receiving device having an interface in accordance with the invention, in perspective representation.
Figure 2:
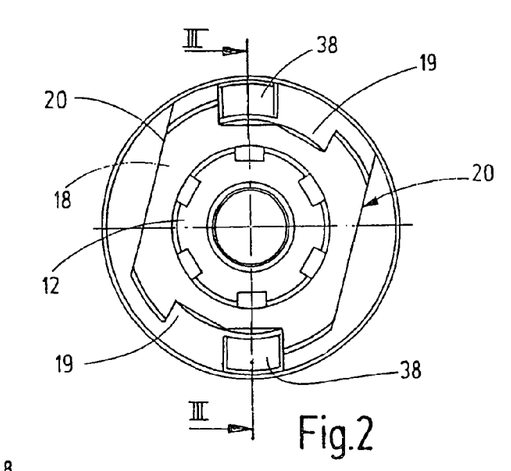
FIG. 2 the device in accordance with FIG. 1, in a plan view of the tool side and in a different scale.
Figure 3:
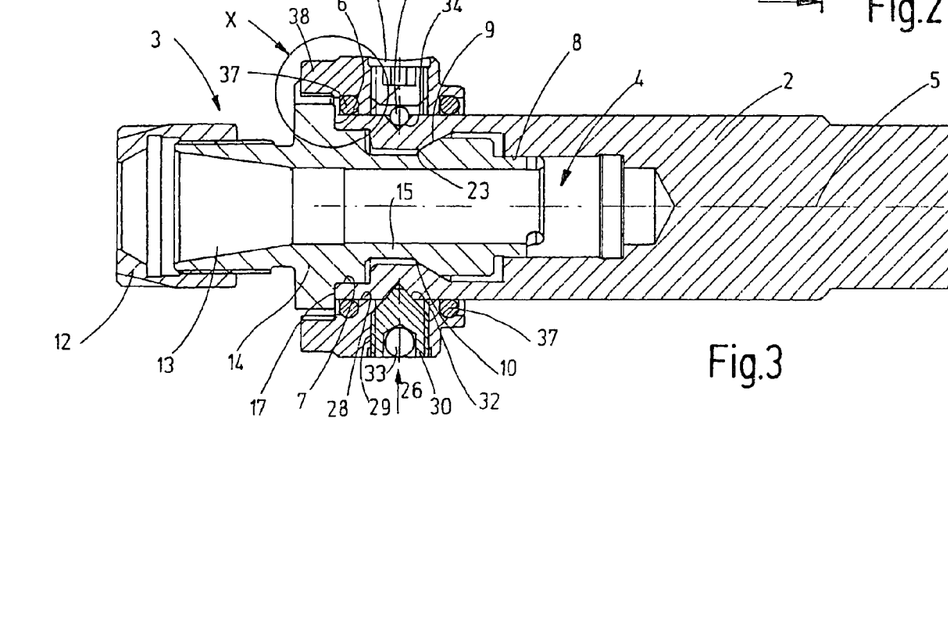
FIG. 3 the device in accordance with FIG. 2, in a side view, in section along line III-III.
Figure 11:
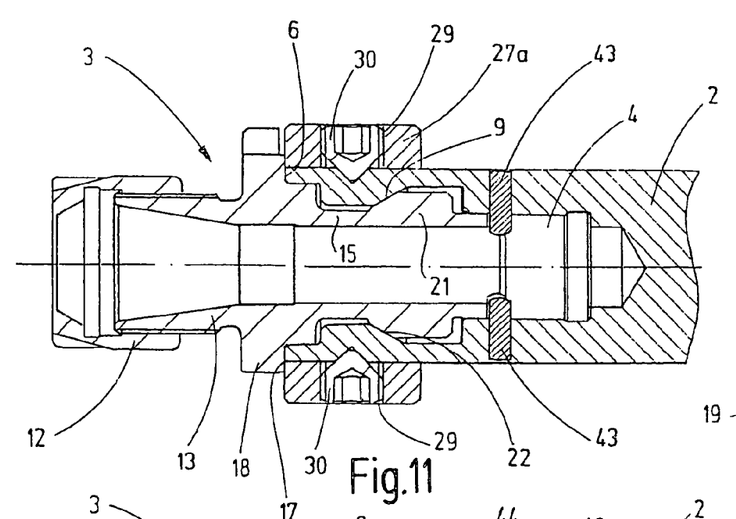
FIG. 11 the device in accordance with FIG. 3, showing a modified embodiment of the interface, in section along line XI-XI of FIG. 12, in a side view of a detail.
Figure 12:
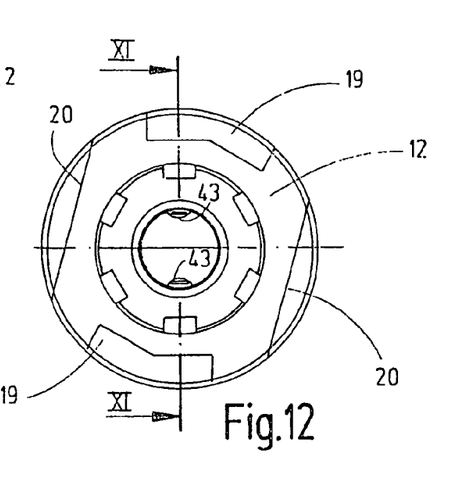
FIG. 12 the device in accordance with FIG. 11, in a plan view of the tool side.

FIGS. 11, 12 show a modified embodiment of the tool receiving device or holding device in accordance with FIGS. 1 through 3. In both embodiments, the same parts have the same reference signs and will not be explained again.

Figure 4:
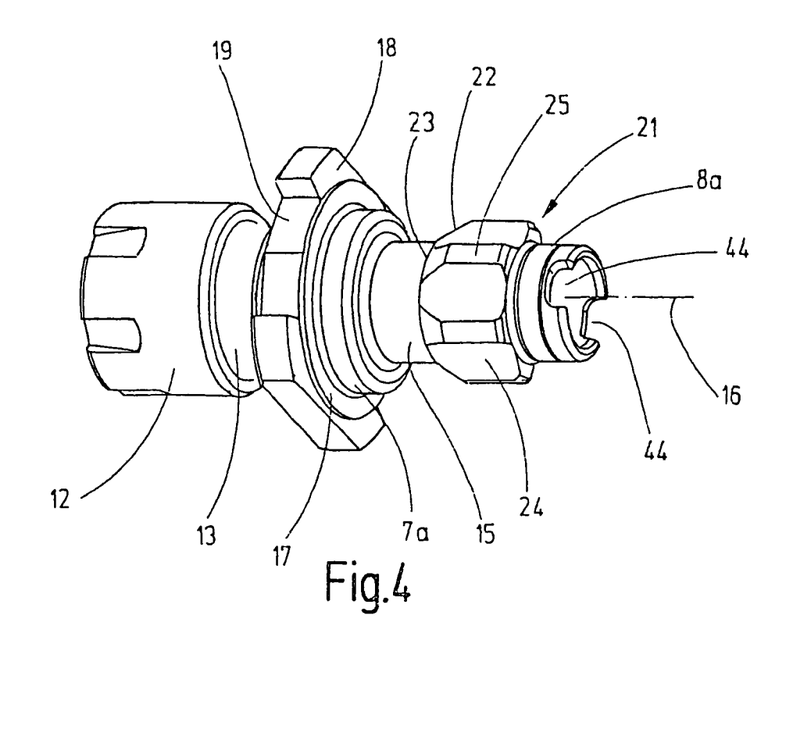
FIG. 4 the insert of the device in accordance with FIG. 3, said insert being designed as the tool holder insert, in a perspective representation.
Figure 5:
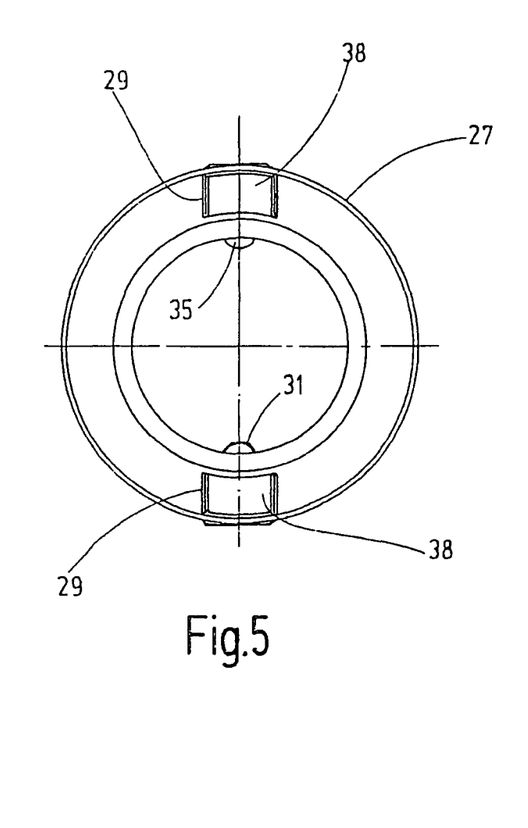
FIG. 5 the head ring of the device in accordance with FIG. 3, in a plan view.
Figure 6:
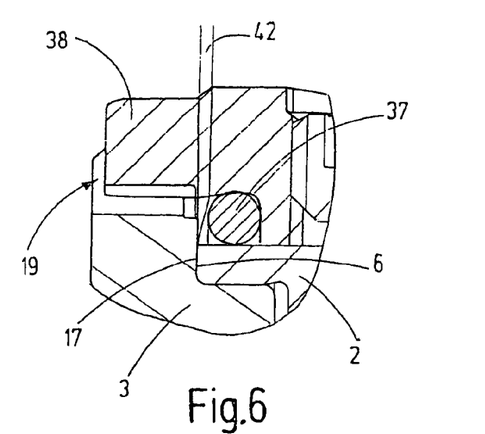
FIG. 6 a detail at X of the interface of the device in accordance with FIG. 3, in a partial representation and in a different scale.

While, in the embodiment in accordance with FIGS. 1 through 3, the dogs 38 are formed to the head ring 27, in the embodiments in accordance with FIGS. 11, 12, a head ring 27a without dogs is used. Instead, as is obvious from FIG. 11, the catch means comprise two cylinder pins 43 that are located diametrically opposite each other on a common cross-sectional plane and extend into the receiving bore 4. In addition, as shown by FIG. 4, the insert 3 is provided with a collet pin 15, said collet pin bearing, on its free end facing way from the plane surface 17, two diametrically opposed open-edge elongated grooves 44, said grooves—with the collet pin 15 inserted in the receiving bore 4—extending over the cylinder pins 43, as is shown by FIG. 11 (and also by FIG. 13). The width of the grooves 44 in circumferential direction is selected in such a manner that they, in interacting with the cylinder pins 43, effect—similarly as the dogs 38 in the recesses 19 of FIGS. 9, 10—a positional orientation of the insert 3 relative to the receptacle body 2 during the coupling and uncoupling operations. In biased state, they take over the transmission of the torque between the insert and the receptacle body 2, as is also done by the dogs 38 in interaction with the lateral surfaces 39a of the recesses 19 in the already described manner.

Considering larger systems, it is possible to also provide three or more cylinder pins 43 instead of two cylinder pins 43; likewise, cases are conceivable in which only one such cylinder pin 43 is present. In this exemplary embodiment, the modified head ring 27a is equipped with two setscrews 30, so that the sphere 35 has been omitted in FIG. 3. a similar embodiment of the head ring 27 as in FIG. 3 is conceivable.

Figure 13:
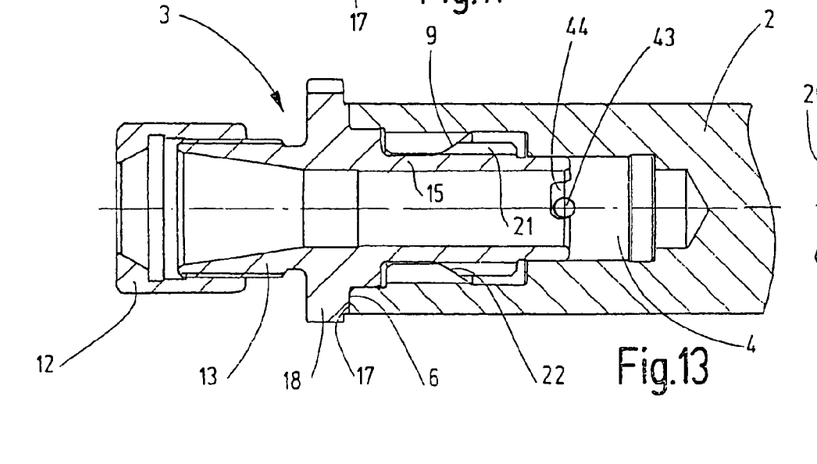
FIG. 13 the device in accordance with FIG. 3 with an additional, modified embodiment of the interface, in section along line XIII-XIII of FIG. 14, in a side view of a detail.
Figure 14:
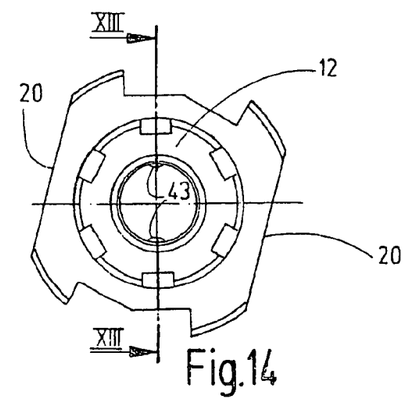
FIG. 14 the device in accordance with FIG. 13, in a plan view of the tool side.

The embodiment in accordance with FIGS. 11, 12 can also be further modified in that the head ring 27a is left off altogether, as is shown by the embodiment in accordance with FIGS. 13, 14. Also in this case, the same parts have the same reference signs as in FIGS. 11, 12 and FIGS. 2 through 6, respectively, and will not be explained again.

In the embodiment in accordance with FIGS. 13, 14, the insert 3 is axially clamped in the receptacle body 2 during the transition from the relaxed position in accordance with FIG. 9 into the clamped position in accordance with FIG. 3 in that the insert 3 is coupled or uncoupled with an appropriately large torque, this being accomplished, if necessary, with a key wrench that is attached to the key surfaces 20 of the insert 3. The axial distances between the plane surfaces 6, 17 and the cone surfaces 9 and 22 of the receptacle body 2 and the inert 3 are selected in such a manner that an elastic deformation is created between the receptacle body 2 and the insert 3 in the region of the ring cross-sections outside or inside the cone surfaces 9, 22, when the insert 3 is twisted out of the relaxed position in accordance with FIG. 9 into the clamped position in accordance with FIG. 10. In order to facilitate the mutual engagement of the cone surfaces 9, 22 when the insert is being twisted during the coupling operation, a run-in chamfer may be provided on the peripheral edges 45, 46 of the ribs 25 of the insert 3 and/or of the ribs 11 of the receiving bore 4 of the receptacle 2 in the region of the cone surfaces 22 and 9, respectively, said run-in chamfer being indicated at 45, 46 in FIGS. 9, 10. To accomplish this, a chamfer resulting at the time of fabrication of the gear profile may potentially already be adequate.

Figure 15:
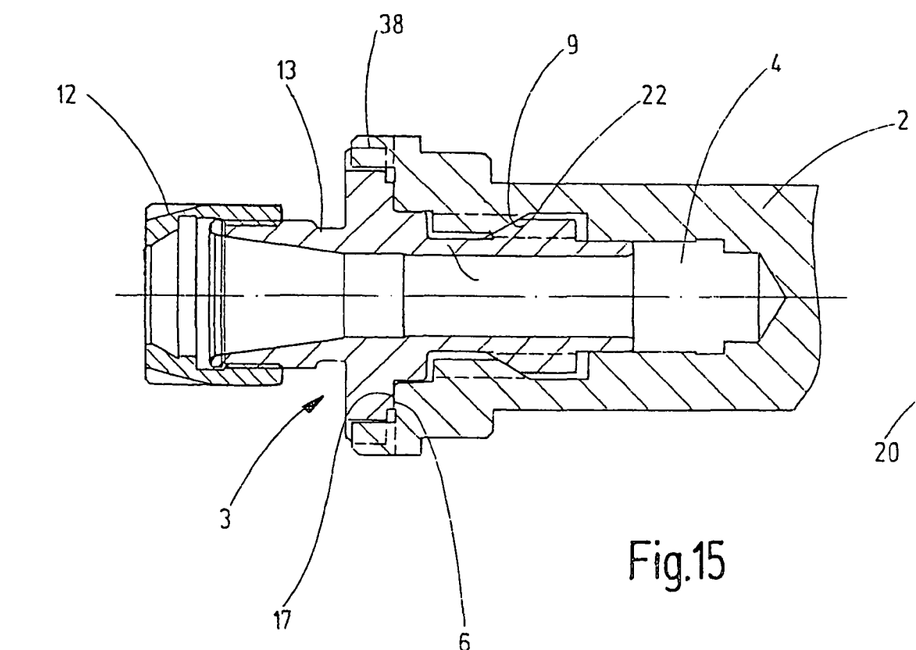
FIG. 15 the device in accordance with FIG. 2 with yet another modified embodiment of the interface, in section along line XV-XV of FIG. 16, in a side view and in detail.
Figure 16:
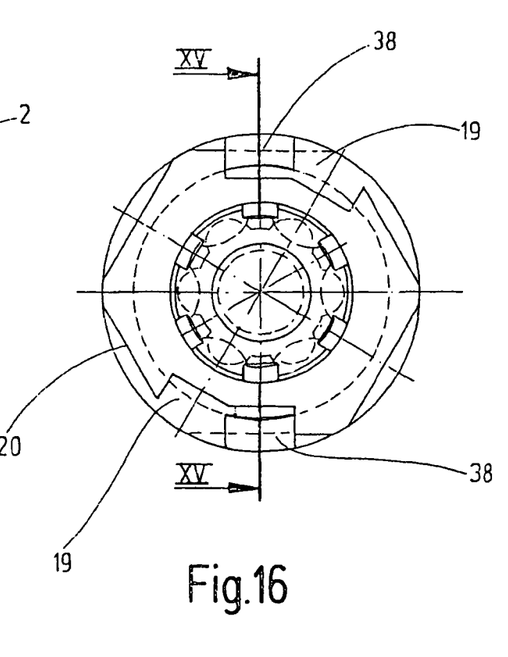
FIG. 16 the device in accordance with FIG. 15, in a plan view of the tool side.

Also, another embodiment in accordance with FIGS. 15, 16 is configured without a head ring 27 or 27a, in which case the insert 3 is clamped in axial direction in the receptacle body in the same manner as in the embodiment in accordance with FIGS. 13, 14. Consequently, the same parts have the same reference signs also in this case.

However, whereas in the embodiment in accordance with FIGS. 13, 14 the catch means comprise cylinder pins 43 in the receptacle body 2 and grooves 44 in the collet pin 15 of the insert 3 interacting therewith, the catch means in the embodiment in accordance with FIGS. 15, 16 are designed in such a manner that the dogs 38 are directly formed to the receptacle body on the front side. The dogs 38 interact with the recesses 19 of an inserted insert 3 in the same manner as has already been descried with reference to FIGS. 2, 3 and 9, 10. Other than that, it is also possible, referring to the embodiment in accordance with FIGS. 1 through 8, for the receptacle body 2 to be directly formed with the dogs 38 and to bear a head ring 27a in accordance with FIG. 11. In this case, the grooves 44 of the collet pin 15 of the insert 3 may naturally be omitted.

Figure 17:
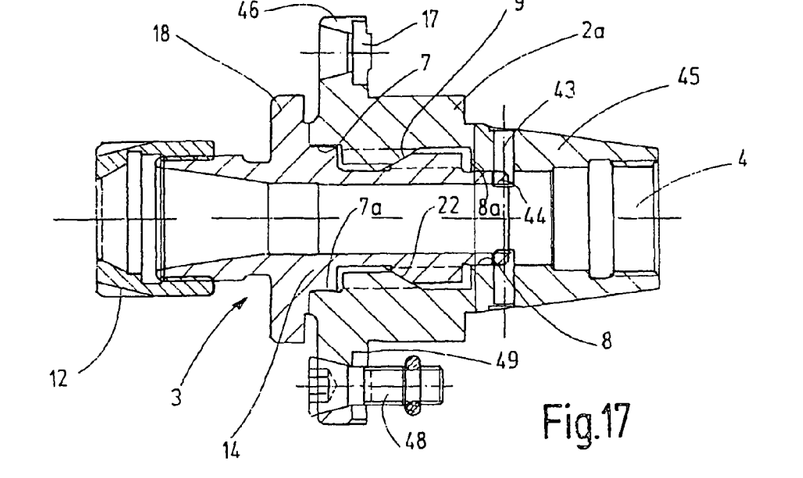
FIG. 17 a tool collet insert for a high-speed tool changing system comprising a tool carrier having a collet chuck receptacle in accordance with DE 102 19 600 C5 and an interface in accordance with the invention, in section along line XVII-XVII of FIG. 18, in a side view.
Figure 18:
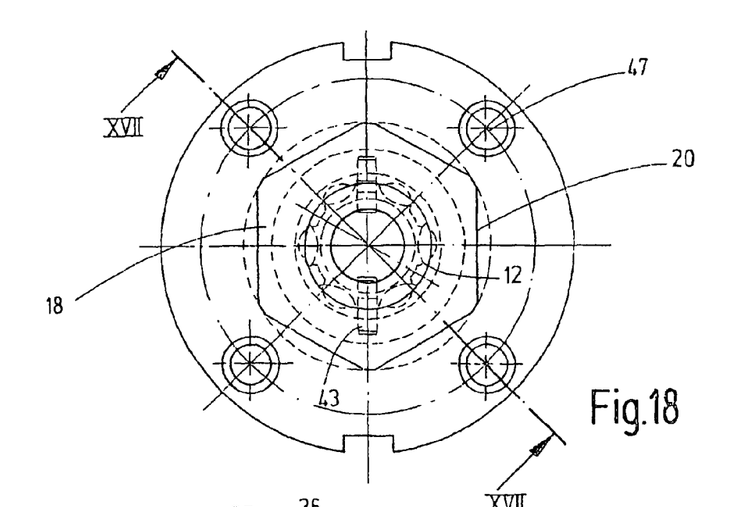
FIG. 18 the tool collet insert in accordance with FIG. 17, in a plan view of the tool side.

Even though the receptacle body 2 in the previously described embodiments is configured as a cylindrical spindle, this does not constitute a restriction of the design of the receptacle body 2. The receiving bore 4 may be provided on any design component meeting the intended purpose, for example in the turret disk of a tool turret, etc. An example of another design of the receptacle body 2 is shown in FIGS. 17, 18, wherein parts that are the same as those in the embodiment of FIGS. 13, 14 have the same reference sign and will not be explained again.

The receptacle body 2a is part of a high-speed tool changing system in accordance with DE 102 19 600 5C and shows that the new interface can be used in a system-crossing manner. In this embodiment, the receptacle body 2a is configured as the tool clamping insert who conical receiving pin 45 can be inserted into a conical bore of a (not illustrated) tool carrier, said conical bore being designed for the accommodation of a collet chuck. The receptacle body 2a is provided with a flange 46 formed to it, said flange having four uniformly distributed, axis-parallel bores 47 for the accommodation of fastening screw bolts 48. The receptacle body 2a having a plane surface 49 is fastened in manner that is described in greater detail in the aforementioned literature reference, in which case this fastening is not the subject matter of the present invention. The receptacle body is provided with the receiving bore 4, said bore being a through bore in this case, and is configured in the region of said bore in accordance with the embodiment of FIGS. 13, 14. Clamping of the insert 3 is accomplished in a similar manner as explained with reference to FIG. 13, namely by an elastic axial deformation of the receptacle body 2a and of the collet pin 15 when the insert 3 is twisted out of the relaxed position in accordance with FIG. 9 into the clamped position in accordance with FIG. 10. the catch means comprise cylindrical pins 43 and grooves 44 corresponding to FIGS. 11, 13. Due to the interaction of the plane surface 6, 17 and cone surfaces 9, 22, this embodiment also ensures perfect concentricity.

As already mentioned in the beginning, the receptacle body 2 containing the receiving bore 4 may be supported so as to be stationary or rotatable. A typical use of a rotabably supported receptacle body 2 is shown in FIG. 19, wherein, again, the same parts of already described embodiments have the same reference signs and will not be explained again.

Figure 19:
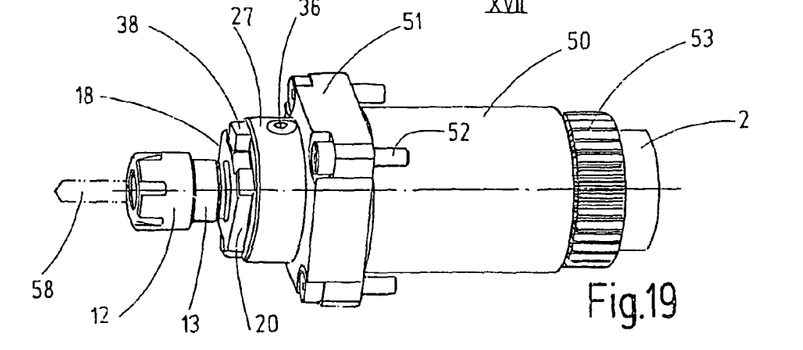
FIG. 19 a driving unit for driven tools, for example a drill comprising the device in accordance with FIG. 1, said device containing the interface in accordance with the invention, in a perspective representation.

FIG. 19 shows a so-called driving unit that comprises a housing 50 in which the receptacle body 2 configured as a cylindrical spindle is supported so a to rotate and has a flange 51 with devices for the accommodation of fastening screws 52. A cogged wheel 53 is placed on the free end of the spindle-shaped receptacle body 2, said free end projecting from the housing 50, in which case said cogged wheel—with the housing 50 placed in an appropriate carrier device, for example, a turret disk—is connected by gear transmission with a driving source.

The driving units in accordance with FIG. 19 may be used, for example, in a 3-spindle frontal drilling apparatus as is illustrated by FIGS. 20, 21, wherein, again the parts of already described exemplary embodiments that are the same have the same reference signs and will not be explained again.

Figure 20:
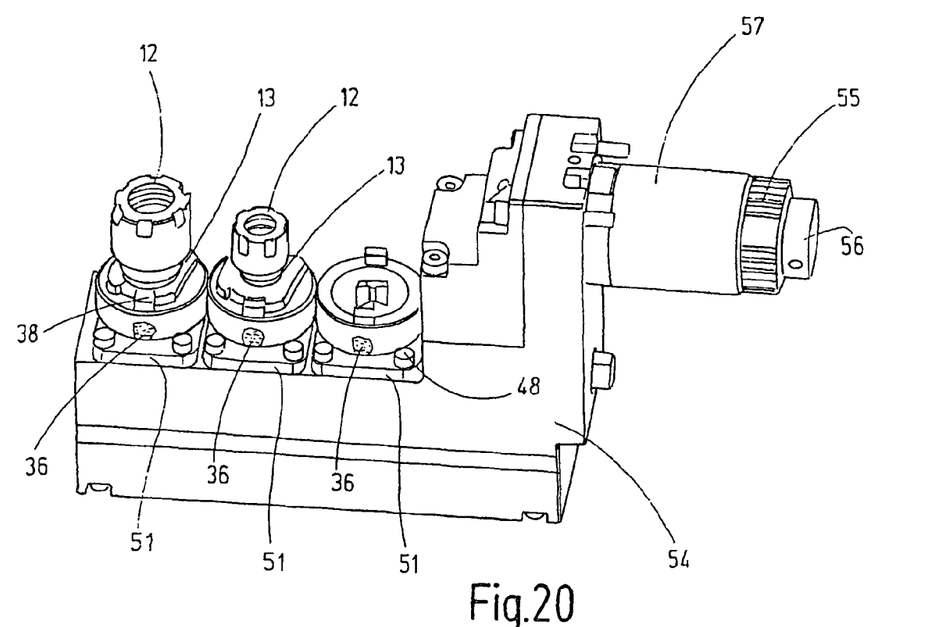
FIG. 20 a 3-spindle frontal drilling apparatus comprising three driving units in accordance with FIG. 19, in perspective, partially schematic, representation.
Figure 21:
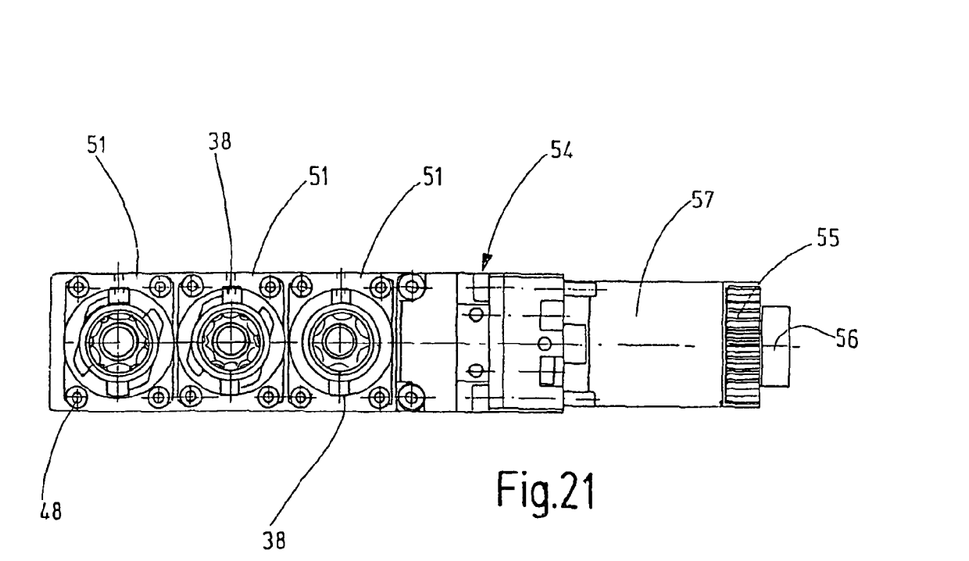
FIG. 21 the frontal drilling apparatus in accordance with FIG. 20, in a plan view.

As is shown in FIGS. 20, 21, the frontal drilling apparatus comprises an essentially L-shaped housing 54 with three driving units successively arranged in a directly abutting manner on one leg in such a manner that their collet chuck receptacles 13 extend parallel to each other with their axes located in a common plane. FIGS. 20, 21 clearly show that a great advantage of the new interface is that, even in confined spaces as given here, the inserts 3 can be easily coupled in and coupled out. To do so, it is sufficient, in the case of the embodiment shown here in accordance with FIGS. 1 through 6, to push the respective insert 3 from the front with its collet pin 15 into the respective receiving 4, to twist said insert out of the position in accordance with FIG. 10, and to then clamp it in firmly by tightening the pressure screw 36. The pressure screw 36 is easily accessible from the side and requires only a fraction of a rotation for clamping. In case there is no lateral accessibility of the pressure screw one of the explained embodiments without head ring 27, 27a may be used.

The cogged wheels 53 of the individual driving units in accordance with FIG. 19 are coupled with each other by gearing and with a common cogged driving wheel 55 that is seated on a shaft 56, said shaft being rotatably supported in a cylindrical bearing part 57 that is arranged so as to project from the housing 54.

Figure 23:
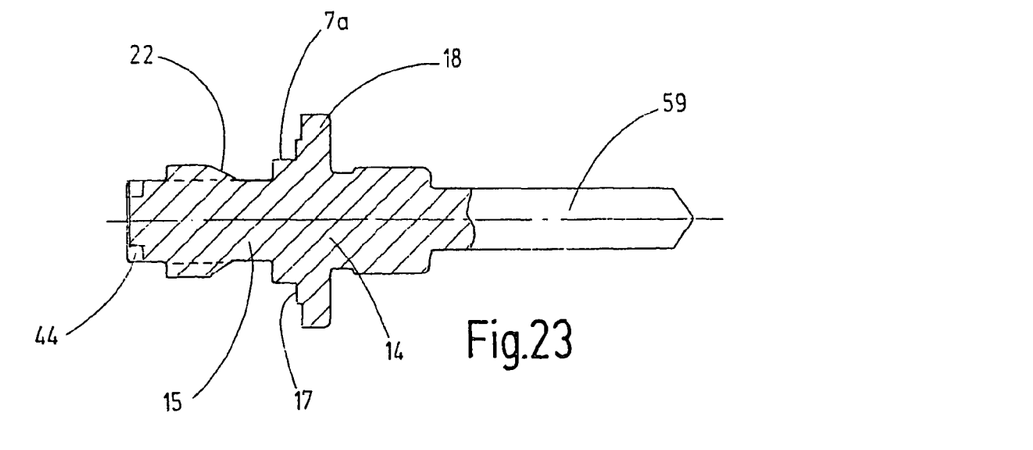
FIG. 23 another embodiment of a tool holder insert for the device in accordance with FIG. 1, said embodiment being in one piece with the tool.

Considering the described embodiments, the insert 3 is designed as a workpiece holder insert or as a tool holder insert comprising a collet chuck receptacle 13 in which the workpiece or a tool, for example, a drill 58, may be clamped in accordance with FIG. 19. Instead of this collet chuck receptacle 13, it is also possible to use all other known embodiments of workpiece or tool receptacles; for example, a cutter arbor, a morse cone and the like, may be provided on the insert body 14. Also, the insert 3 may be made in one piece with the associate tool, for example a drill 59, consisting of steel or hard metal as shown by FIG. 23.

Figure 22:
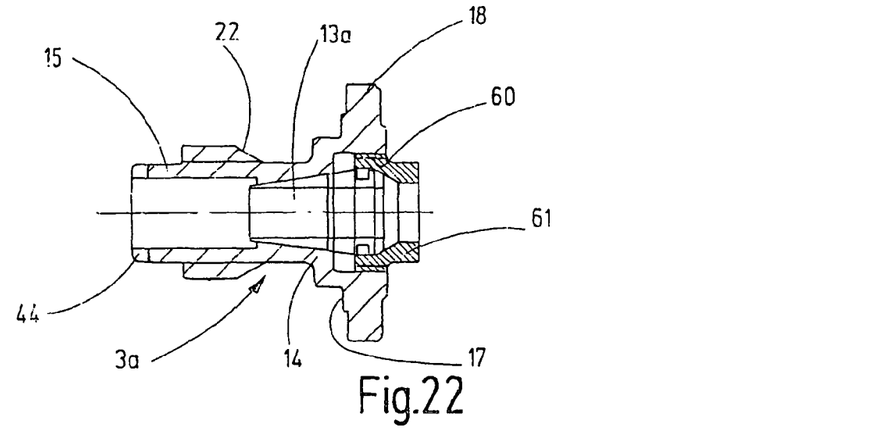
FIG. 22 a modified embodiment of the tool collet insert in accordance with FIG. 4, axially in section, in a side view and in different scale.

Instead of an externally threaded collet chuck receptacle 13 and a sleeve nut 12 (cf., for example, FIG. 3), it is also possible to use an insert 3a as shown in FIG. 22. Considering this embodiment, the collet chuck receptacle 13a is provided with an internal thread 60 into which an externally threaded clamping nut 61 is screwed. This results in a particularly space-saving embodiment that is of advantage when the space for assembly is particularly confined.

Figure 24:
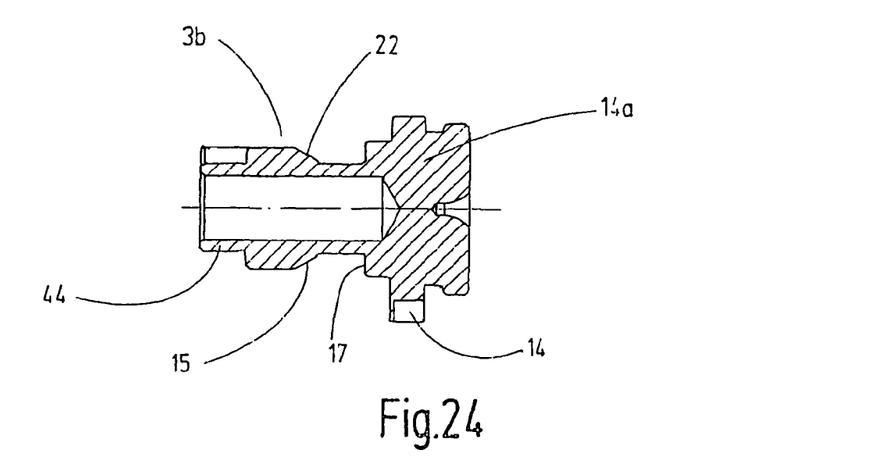
FIG. 24 a plug for closing the receptacle body in accordance with FIG. 8, axially in section, in a side view.

Finally, FIG. 24 shows an insert 3b that is configured as a plug in order to close a not used receiving bore 4, for example in the case of the 3-spindle frontal drilling apparatus in accordance with FIGS. 20, 21. In this case, the insert body 14a is designed as a solid plug component that is adjoined by the collet pin 15, said collet pin being configured in accordance with FIG. 4. This insert may also be made of plastic material because, as a rule, it is not subjected to any stress. Its cone surface 22, like the insert 3 in accordance with FIG. 4, is clamped in the receptacle body 2 as have been explained with reference to FIGS. 9, 10. Likewise, separate catch means will not be necessary or else a recess 19 will be sufficient, for example. If necessary, the collet pin 15 may also be provided with grooves 44.

Considering the embodiment in accordance with FIG. 1 through 8, for example, the first cone surface 9 is arranged in the receiving bore 4 at an axial distance from the first plane surface 6. This distance may also be greater or smaller than depicted. Under certain circumstances, this distance may also be completely omitted, so that the cone surface 9 essentially directly adjoins the pre-centering surface 7 or the plane surface 6.

The cone angles of the cone surfaces 9, 22, as a rule, have the same size; however, they may also minimally deviate from each other.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. In combination a receptacle having a body (2) and a tool- or workpiece holder insert connectable with the receptacle body, wherein
   (a) the receptacle body has, (i) a cylindrical receiving bore (4) having a bore axis (5), (ii) a finely machined, dimensionally accurate first plane surface (6) extending at a right angle with respect to the bore axis (5) and at least partially surrounding the bore axis (5), and (iii) a first cone surface (9) coaxial with the bore axis (5) and having a tapered end facing toward said first plane surface (6), wherein said first cone surface (9) is located on an inner wall of said receiving bore (4) and is configured so as to be interrupted by channel-like or groove-like recesses (10) that are extending parallel to the bore axis (4) and forming a gear-like inner profile,
   the insert (3) has (iv) a collet pin (15) having an axis and configured to be inserted into said receiving bore (4), (v) a finely machined, dimensionally accurate second plane surface (17) extending at right angle with respect to the collet pin axis (16) and at least partially surrounding the collet pin axis (16), and (vi) a profile part coaxial with the collet pin axis and having a greater diameter than the collet pin, wherein said profile part is arranged in an axial distance from said second plane surface (17) and provided with a second cone surface (22) having a tapered end facing toward said second plane surface, and wherein said second cone surface is configured so as to be interrupted by channel- or groove-like recesses (24) that are extending parallel to the collet pin axis and forming a gear outer profile that is complementary to said gear-like inner profile of said receiving bore (4), and
   (c) with the collet pin inserted in the receiving bore the two plane surfaces (6, 17) are superimposed, and the two cone surfaces (9, 22) of the inner and of the outer profile, respectively, can be clamped against each other by rotating the collet pin relative to the receiving bore from an unclamped position in which the two gear-like profiles are not overlapping into a clamped position in which the two gear-like profiles are overlapping and in which the two superimposed plane surfaces are biased against each other.

2. The combination according to claim 1, characterized in that the first and/or second cone surfaces (9, 22) are discontinuous in circumferential direction.

3. The combination according to claim 2, characterized in that the receptacle body (2) and the insert (3) each has at least one pre-centering surface (7, 8, 7a, 8a), and that a pre-centering surfaces of the receptacle body and a pre-centering surface of the insert are arranged so as to abut against each other when the collet pin is inserted in the receiving bore.

4. The combination according to claim 3, characterized in that at least two pairs of associate coaxial pre-centering surfaces (7, 8, 7a, 8a) on the receptacle body (2) and on the insert (3) are arranged at a distance from each other in axial direction of the bore or collet pin axis (5, 16).

5. The combination according to claim 2, characterized in that the cone surface (9) has a run-in chamfer in the region of the edge (45) of a rib (25).

6. The combination according to claim 5, characterized in that the is provided at least one pre-centering surface (7a) coaxial with respect to the collet pin longitudinal axis (16).

7. The combination according to claim 6, characterized in that there is provided a first pre-centering surface (7a) adjacent to or directly adjoining the plane surface (17), and a second pre-centering surface (8a) at a distance from said first pre-centering surface in collet pin longitudinal direction.

8. The combination according to claim 7, characterized in that the second pre-centering surface (8a) is arranged close to the free end of the collet pin (15).

9. The combination according to claim 7, characterized in that catch means of grooves (44) are arranged in the region of the collet pin.

10. The combination according to claim 9, characterized in that the catch means of grooves (44) have an open-edge recess arranged in the region of the free collet pin end.

11. The combination according to claim 9, characterized in that the catch means of recesses (19) are arranged on the insert body (14) or on a part connected therewith.

12. The combination according to claim 5, characterized in that there is provided catch means of dogs (38) and recesses (19) for coupling said insert with said receptacle body (2), the collet pin (15) of said insert being inserted in the receiving bore (4) of said receptacle body.

13. The combination according to claim 12, characterized in that the catch means recesses 19 are configured so as to limit the rotational movement of the insert (3) relative to the receptacle body (2) in both rotational directions.

14. The combination according to claim 5, characterized in that insert body (14) comprises a receptacle (13) for the non-rotational connection with a tool or a workpiece.

15. The combination according to claim 5, characterized in that said insert it is one piece and includes a tool (59).

16. The combination according to claim 1 characterized in that catch means of dogs 38 are provided on the receptacle body (2) and catch means of receptable body (19) are provided on the insert (3), said catch means of the receptacle body—being configured to engage the catch means of the insert when the collet pin (15) is inserted in the receiving bore (4).

17. The combination according to claim 16, characterized in that the catch means of dogs (38) of the receptacle body and the catch means of recesses 19 of the insert (3) interacting therewith are configured so as to enable a twisting movement of the insert (3) relative to the receptacle body (2).

18. The combination according to claim 1, characterized in that of a catch means comprising a cylinder pin 43 on the receptacle body 2 and open edge elongated grooves 44 the insert (3) interacting therewith are arranged on said insert itself or on a part connected therewith.

19. The combination according to claim 1, characterized in that clamping means (26) are arranged on the receptacle body (2) and/or on the insert (3), as a result of which the two plane surfaces (6, 17) can be clamped against each other when the collet pin (15) is inserted in the receving bore (4).

20. The combination according to claim 19, characterized in that the clamping means (27, 36) can be actuated from the outside of the receptacle body (2).

21. The combination according to claim 19, characterized in that the clamping means are configured so as to of on the cone surfaces (9, 22).

22. The combination according to claim 19, characterized in that the clamping means comprise a clamping element (27, 27a) arranged in the receptacle body (20), said clamping element, when actuated radially deforming the receptacle body (2) in an elastic manner.

23. The combination according to claim 1, characterized in that said insert comprises an insert body (14) with a collet pin (15) projecting from one side of said insert body, said collet pin being at least partially circumscribed by said finely machined, dimensionally stable plane surface (17), said plane surface extending at a right angle to the collet pin longitudinal axis (16), and that said second cone surface (22) is arranged on the collet pin at an axial distance from the plane surface, whereby the tapered end of said second cone surface is aligned so as to face toward the second plane surface (17).

24. A tool- or workpiece-holder insert for use with a combination according to claim 1, and configured so as to be received in a receiving bore of a receptacle body and to be connected therewith, wherein said insert (3) comprises (iv) an insert body (14), (v) a collet pin (15) extending from one side of insert body, (vi) a finely machined, dimensionally accurate second plane surface (17) extending at a right angle to the collet pin axis and at least partially surrounding the collet pin axis, said plan surface being adapted to be engaged with a finely machined, dimensionally accurate first plane surface of the receptacle body, and (vii) a profile part (15) coaxial with the collet pin axis and having a greater diameter than the collet pin, wherein said profile part is arranged in an axial distance from said second plane surface (17) and is provided with a second cone surface (22) having a tapered end facing toward said second plane surface, and wherein said second cone surface is configured so as to be interrupted by channel-like or groove-like recesses (24) that are extending parallel to the collet pin axis and forming a gear-like outer profile that is complementary to a gear-like inner profile on an inner wall of the receiving bore when the collet pin is inserted therein.

25. The insert according to claim 24, characterized in that the collet pin (15) is essentially cylindrical at least in some regions.

26. The insert according to claim 24, characterized in that the cone surface (17) is configured so to be interrupted in circumferential direction.

27. The insert according to claim 26, characterized in that the cone surface (22) is provided with run-in chamfers in the region of the edge (46) of the recesses (24).

28. The insert according to claim 24, characterized in that the second cone surface (17) is interrupted by at least two channel-like or groove-like recesses (24).

29. The insert according to claim 24, characterized in that the cone surface (22) is provided on a profile part (21) that is coaxial with the collet pin (15), said profile part having axis-parallel channel-like or groove-like recesses (24) with ribs (25) interposed between them.

30. The insert according to claim 29, characterized in that the recesses (24) extend across the profile part (21) that is coaxial with the collet pin, the cone surface (22) being provided on said profile part.

31. The combination according to claim 24, characterized in that said insert is configured as a plug for a receiving bore (4) of a receptacle body (2).

32. A receptacle body for use with a combination according to claim 1 and for receiving a tool- or workpiece-holder insert adapted to be connected therewith, wherein said receptacle body has (i) a cylindrical receiving bore (4) for said insert (3) opening toward one face side and having a bore axis (5), (ii) a finely machined dimensionally accurate first plane surface (6) arranged in the area of the face side, extending at a right angle relative to the bore axis and being adapted to be engaged by a finely machined dimensionally accurate plane surface of an insert received in said bore, and (iii) a first cone surface (9) coaxial with the bore axis and having a tapered end facing toward said first plane surface, wherein said first cone surface a located on an inner wall of said receiving bore and is configured so as to be interrupted by channel-like or groove-like recesses (10) that are extending parallel to the bore axis and forming a gear-like inner profile that is boated in an axial distance to the first plane surface.

33. The receptacle body according to claim 32, characterized in that the cone surface (9) is configured so as to be discontinuous in circumferential direction.

34. The receptacle body according to claim 33, characterized in that the cone surface (9) is interrupted by at least two channel-like or groove-like recesses (10).

35. The receptable body according to claim 32, characterized in that said receptacle body has at least one cylindrical pre-centering surface (7, 8) for a collet pin (15) inserted in the receiving bore, said pre-centering surface being concentric to the bore axis.

36. The receptacle body according to claim 35, characterized in that said receptacle body has a first pre-centering surface (7), said first pre-centering surface being arranged so as to be adjacent to or directly adjoining the first plane surface (6), and has a second pre-centering surface (8), said second pre-centering surface being arranged in the depth of the receiving bore (4) at n axial distance from the first pre-cantering surface (7).

37. The receptacle body according to claim 32, characterized in that said receptacle body comprises catch means of dogs (38) or cylinder pins (43) for the coupling with an insert (3) whose collet pin (15) has been inserted into the receiving bore (4), said catch means being arranged on the receptacle body (7) itself or on a part (27) connected therewith.

38. The receptacle body according to claim 37, characterized in that the catch means comprises at least one cylinder pin (43) extending into the receiving bore.

39. The receptacle body according to claim 37, characterized in that the catch means of dogs (38) comprises at least one coupling part arranged in the region of the face side of the receptacle body (2).

40. The receptacle body according to claim 32, characterized in that it comprises a clamping nut (12) for an insert (3) whose collet in (15) is inserted in the receiving bore (4).

41. The receptacle body according to claim 40, characterized in that the clamping nut (12) is designed so that it can be actuated from the outside of the receptacle body (2).

42. The receptacle body according to claim 32, characterized in that it comprises clamping means have a ring (27) set on the receptacle body (2), said ring comprising at least one clamping element of a set screw (30) or a pressure screw (36) acting in a radially inward direction on the receptacle body (2), said clamping element enabling an elastic radial deformation in the region of the first cone surface (9) of the receptacle body.

43. The receptacle body according to claim 42, characterized in that it comprises at least two spaced apart clamping elements of a set screw (30) and a pressure screw (36) arranged along the circumference of the receptacle body, at least one of said clamping elements being configured so as to act in an essentially punctiform manner on the receptacle body (2).

44. The receptacle body according to claim 42, characterized in that the ring (27) is sealed with respect to the receptacle body (2).

* * * * *

UNITED STATES PATENT AND TRADEMARK OFFICE
CERTIFICATE OF CORRECTION

| | | |
|---|---|---|
| PATENT NO. | : 8,920,081 B2 | Page 1 of 1 |
| APPLICATION NO. | : 12/924188 | |
| DATED | : December 30, 2014 | |
| INVENTOR(S) | : Manfred Neumeier | |

It is certified that error appears in the above-identified patent and that said Letters Patent is hereby corrected as shown below:

Claims

In column 11, line 39, Claim 1 please insert -- (b) -- in front of "the insert ...".

In column 12, line 51, Claim 16 please delete "receptacle body" and insert -- recesses --.

In column 14, line 39, Claim 36 please delete "pre-can-" and insert -- pre-cen- --.

Signed and Sealed this
Twentieth Day of October, 2015

Michelle K. Lee
*Director of the United States Patent and Trademark Office*